2 Sheets--Sheet 1.
W. M. SKELTON.
Combined Hand-Rakes and Rollers.
No. 156,715. Patented Nov. 10, 1874.
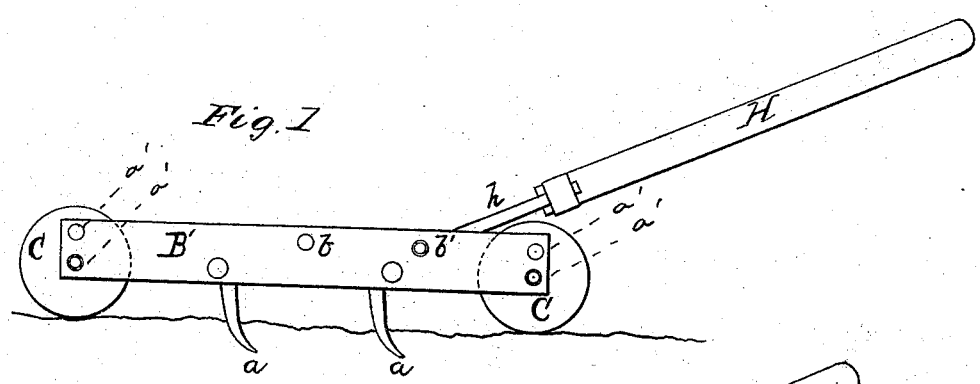
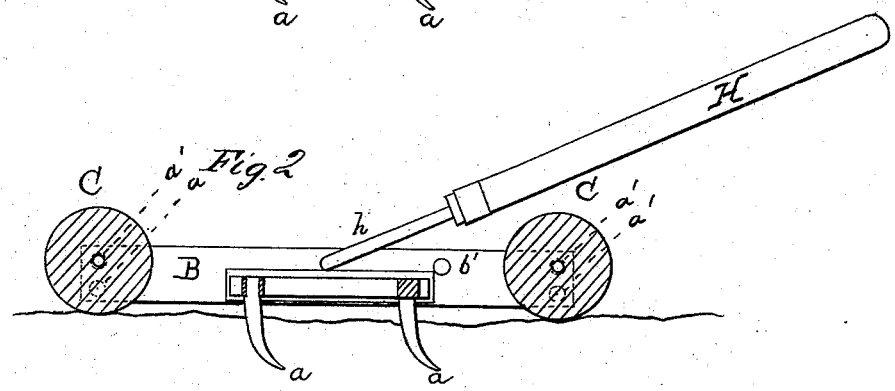
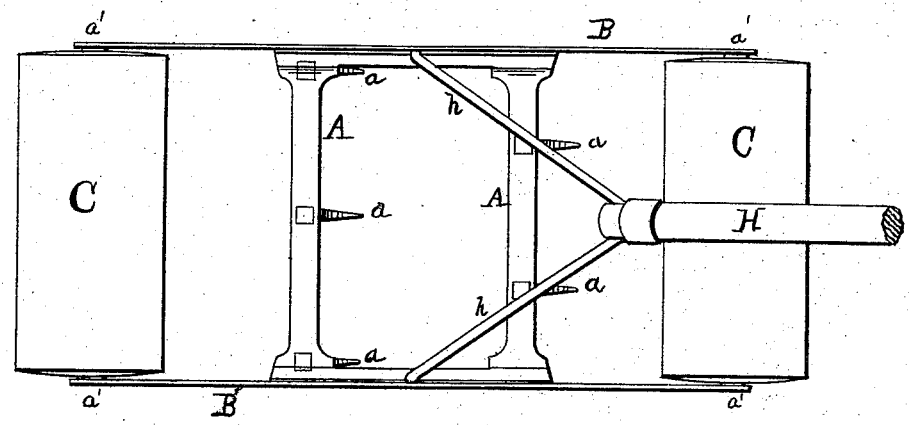
WITNESSES
Robert Everett,
George Elpham,
INVENTOR
William M. Skelton
BY Chipman Hosmer & Co
ATTORNEYS

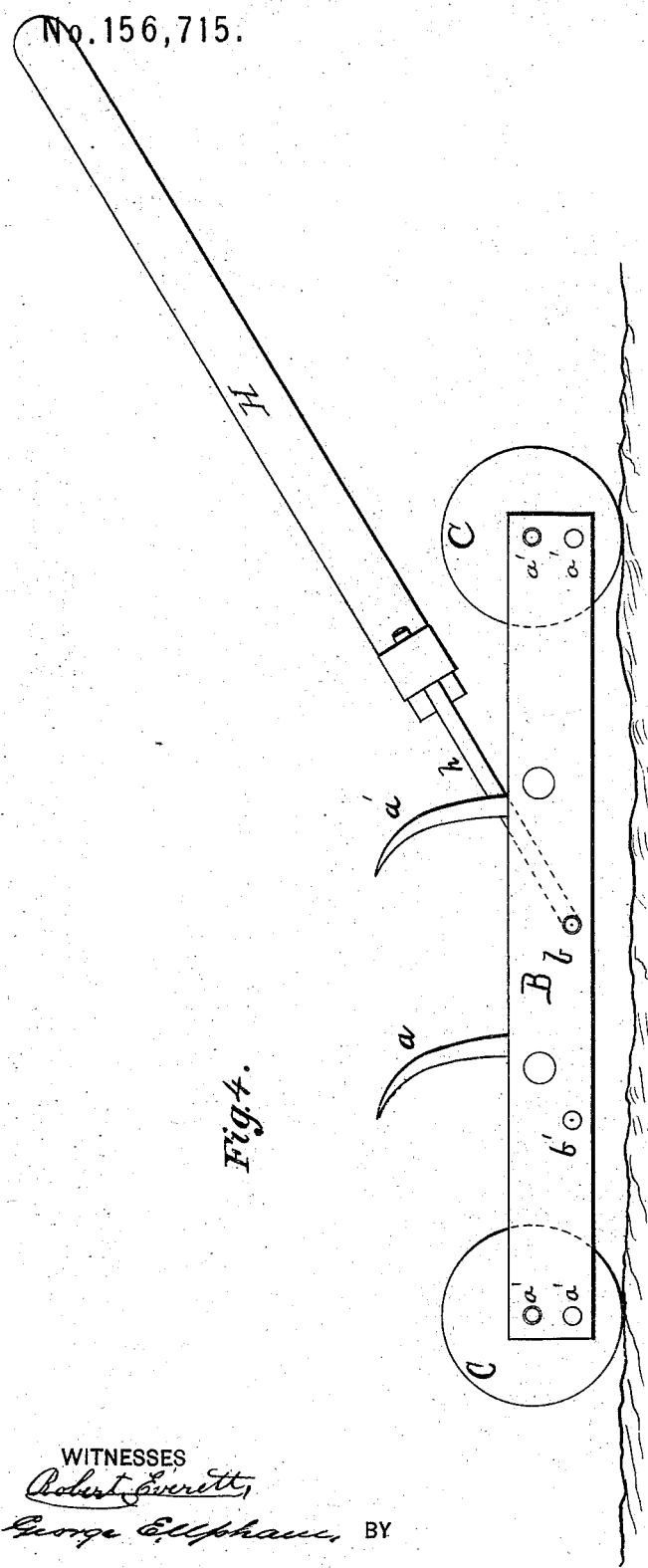

UNITED STATES PATENT OFFICE.

WILLIAM M. SKELTON, OF GREENCASTLE, INDIANA.

IMPROVEMENT IN COMBINED HAND RAKES AND ROLLERS.

Specification forming part of Letters Patent No. 156,715, dated November 10, 1874; application filed April 25, 1874.

*To all whom it may concern:*

Be it known that I, WILLIAM M. SKELTON, of Greencastle, in the county of Putnam and State of Indiana, have invented a new and valuable Improvement in Agricultural Machines; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a side view of my machine, and Fig. 2 is a sectional view. Fig. 3 is a plan view, and Fig. 4 a side elevation, of my machine reversed.

This invention has relation to machines combining in one form a cultivator, a rake, and rollers for leveling the soil; and it consists in a rake or harrow, having curved teeth arranged in gangs upon a frame, in combination with two elastic metal side plates or bars, perforated at their ends to afford bearings for the journals of rollers. It also consists in the combination with a harrow or rake secured to side plates, which are provided at both ends with rollers, of a handle having applied to it two arms, having a spring action and pivotal ends, for a purpose hereinafter to be explained.

In the annexed drawings, A A designate the cross-bars of the frame of a rake or harrow, which is supplied with teeth $a$, arranged in gangs, and which are curved forward, so that when started their points may readily penetrate into the earth, and also be readily freed of any accumulation of grass by a reverse movement. This frame is rigidly secured in any suitable manner to two side plates, B B′, of the same length, and at or near the middle of the length thereof. These side plates B B′ are provided at each end with perforations $a'$ $a'$, which occupy the same positions on each of the side bars relative to each other, and serve as bearings for the journals of two rollers, C C, of suitable diameter and weight. At the middle of the length and between the bars A A are constructed other perforations $b$ $b$ on the plates B B′, and in front of the bars A A still other perforations $b'$ $b'$ are constructed, for a purpose hereinafter to be explained.

The rollers C C serve to regulate the depth to which the teeth $a$ $a$, upon the frame, are to penetrate, and this penetration is increased by engaging the journals of the rollers C C into the upper perforations upon the side plates B B, and this penetration is decreased by engaging said journals with the lower perforations upon the plates B B′. This is self-evident, reference being had to Figs. 1 and 2 of the drawings.

H designates a draft-handle, constructed with diverging spring-arms $h$ $h$, which are provided at their ends with pivotal extremities $i$ $i$. These extremities I insert into the perforations $b$ $b$ $b'$ $b'$, and thus provide a means of traction, which I may vary to suit the nature of the surface passed over.

When it is desired to level a piece of land without breaking or scratching the surface, I reverse the machine with the teeth upward, and thus provide a convenient roller, as shown, Fig. 4.

What I claim, and desire to secure by Letters Patent, is—

1. A rake or harrow, having teeth $a$ $a$, combined with elastic metal side plates B B, affording bearings for rollers C C, substantially as described.

2. The handle H, with spring-arms $h$ $h$, which have pivotal extremities, in combination with side bars B B, a rake or harrow and rollers, C C, substantially as and for the purpose specified.

In testimony that I claim the above I have hereunto subscribed my name in the presence of two witnesess.

WILLIAM MARTIN SKELTON.

Witnesses:
HENRY H. C. FARROW,
THOMAS J. JOHNSON.